US012798917B2

(12) United States Patent
Zhang et al.

(10) Patent No.: US 12,798,917 B2
(45) Date of Patent: Nov. 17, 2026

(54) ELECTRODE PLATE CONVEYING MECHANISM AND ELECTRODE PLATE FORMING SYSTEM

(71) Applicant: CONTEMPORARY AMPEREX TECHNOLOGY CO., LIMITED, Ningde (CN)

(72) Inventors: Cong Zhang, Ningde (CN); Zhihua Wen, Ningde (CN); Yitai Guo, Ningde (CN); Yongli Zhang, Ningde (CN); Yunru Shi, Ningde (CN); Guoda Huang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 143 days.

(21) Appl. No.: 18/778,605

(22) Filed: Jul. 19, 2024

(65) Prior Publication Data

US 2024/0367932 A1 Nov. 7, 2024

Related U.S. Application Data

(63) Continuation of application No. PCT/CN2022/073302, filed on Jan. 21, 2022.

(51) Int. Cl.

*B23P 19/00* (2006.01)
*B65H 20/02* (2006.01)

(Continued)

(52) U.S. Cl.

CPC ............ *B65H 23/24* (2013.01); *B65H 20/02* (2013.01); *H01M 10/0409* (2013.01);

(Continued)

(58) Field of Classification Search

CPC .. B65H 23/24; B65H 20/02; B65H 2404/147; B65H 2406/30; B65H 2701/19;

(Continued)

(56) References Cited

U.S. PATENT DOCUMENTS

2012/0115021 A1* 5/2012 Yotsumoto .......... H01M 50/567 29/730
2013/0326865 A1* 12/2013 Kobayashi .......... H01M 4/0433 29/623.1

(Continued)

FOREIGN PATENT DOCUMENTS

CN 209056564 U 7/2019
CN 211088438 U 7/2020

(Continued)

OTHER PUBLICATIONS

The World Intellectual Property Organization (WIPO) International Search Report and Written Opinion for PCT/CN2022/073302 Sep. 20, 2022 12 Pages (including translation).

(Continued)

*Primary Examiner* — Paul D Kim
(74) *Attorney, Agent, or Firm* — ANOVA LAW GROUP, PLLC

(57) ABSTRACT

An electrode plate conveying mechanism includes: a first conveying roller used for conveying an electrode plate; and a negative pressure supply unit arranged on at least one end of the first conveying roller, spaced apart from the first conveying roller in an axial direction of the first conveying roller, and used for forming a negative pressure around a tab of the electrode plate so as to prevent the tab from being folded.

15 Claims, 5 Drawing Sheets

(51) Int. Cl.
*B65H 23/24* (2006.01)
*G11C 5/12* (2006.01)
*H01M 10/04* (2006.01)

(52) U.S. Cl.
CPC .... *B65H 2404/147* (2013.01); *B65H 2406/30* (2013.01); *B65H 2701/19* (2013.01)

(58) Field of Classification Search
CPC ............... H01M 4/04; H01M 10/0404; H01M 10/0409; H01M 10/0587; Y02E 60/10
See application file for complete search history.

(56) References Cited

U.S. PATENT DOCUMENTS

| | | | | |
|---|---|---|---|---|
| 2021/0043980 | A1* | 2/2021 | Wang | B65H 23/26 |
| 2024/0313365 | A1* | 9/2024 | Wen | H01M 50/531 |

FOREIGN PATENT DOCUMENTS

| | | | |
|---|---|---|---|
| CN | 215236887 | U | 12/2021 |
| CN | 216015617 | U | 3/2022 |

OTHER PUBLICATIONS

The European Patent Office (EPO) Communication under Rule 71(3) EPC for Application No. 22921165.1, Oct. 6, 2025 46 Pages.
The European Patent Office (EPO) The Extended European Search Report for Application No. 22921165.1 Dec. 16, 2024 6 Pages.
The European Patent Office (EPO) Decision to grant a European patent pursuant to Article 97(1) EPC for Application No. 22921165.1 Dec. 18, 2025 3 Pages.

* cited by examiner

ELECTRODE PLATE CONVEYING MECHANISM AND ELECTRODE PLATE FORMING SYSTEM

CROSS-REFERENCE TO RELATED APPLICATION

This application is a continuation of International Application No. PCT/CN2022/073302, filed on Jan. 21, 2022, the entire content of which is incorporated herein by reference.

TECHNICAL FIELD

The present application relates to the technical field of batteries, and more particularly relates to an electrode plate conveying mechanism and an electrode plate forming system.

BACKGROUND

With energy conservation and emission reduction being the key to the sustainable development of automobile industry, electric vehicles have become an important part of the sustainable development of automobile industry due to their advantages in energy conservation and environmental protection. For the electric vehicles, a battery technology is an important factor related to their development. A battery includes an electrode assembly, and the electrode assembly may be formed by winding a positive electrode plate and a negative electrode plate.

In the development of the battery technology, production cost is also a non-negligible issue besides improvement of battery performance. Therefore, how to reduce the production cost is an urgent technical problem to be solved in the battery technology.

SUMMARY

The objective of the present application is to provide an electrode plate conveying mechanism and an electrode plate forming system, which can improve the material utilization rate and reduce the production cost.

The present application is achieved through the following technical solutions:

In a first aspect, the present application provides an electrode plate conveying mechanism, including: a first conveying roller used for conveying an electrode plate; and a negative pressure supply unit arranged on at least one end of the first conveying roller, spaced apart from the first conveying roller in an axial direction of the first conveying roller, and used for forming a negative pressure around a tab of the electrode plate so as to prevent the tab from being folded.

According to the electrode plate conveying mechanism provided by this embodiment of the present application, at least one end of the first conveying roller is provided with the negative pressure supply unit, and the negative pressure is formed around the tab of the electrode plate by the negative pressure supply unit so as to reduce air resistance and then reduce the probability of tab folding; and in addition, the negative pressure supply unit is spaced apart from the first conveying roller in the axial direction of the first conveying roller so as to be prevented from rubbing with the tab and generating dust, thereby guaranteeing the product quality, increasing the material utilization rate and reducing the production cost.

According to some embodiments of the present application, the negative pressure supply unit is an air amplifier. The air amplifier includes an airflow-guiding cavity, an amplifying cavity communicating with the airflow-guiding cavity, and a gas intake port used for conveying compressed gas to the amplifying cavity. The airflow-guiding cavity is close to the first conveying roller relative to the amplifying cavity, the airflow-guiding cavity is provided with a suction port facing the first conveying roller, the amplifying cavity is provided with an exhaust port facing away from the first conveying roller, and the compressed gas is used for establishing the negative pressure, such that the airflow-guiding cavity guides, through the suction port, outside gas into the amplifying cavity.

In the above solution, the negative pressure supply unit is the air amplifier, a small part of compressed gas is input through the gas intake port, such that the airflow-guiding cavity guides, through the suction port, tens of times of outside gas into the amplifying cavity to be exhausted, thereby forming a functional area with one side for blowing and the other side for suction. By utilizing the characters of the air amplifier, the air around the tab may be guided to the exhaust port of the amplifying cavity, such that the local negative pressure is formed around the tab, the air resistance is reduced, then, the probability of folding of the tab is reduced, and the material utilization rate is increased. The air amplifier is simple in structure and small in occupied space, and is only driven by the compressed gas, and thus, is low in energy consumption and safe in use.

According to some embodiments of the present application, the air amplifier includes a first cylinder and a second cylinder, the second cylinder is sleeved with part of the first cylinder, the amplifying cavity is formed in the second cylinder, a part, not sleeving the second cylinder, of the first cylinder forms the airflow-guiding cavity, the gas intake port is formed in an outer peripheral surface of the first cylinder and penetrates through the first cylinder, the suction port is formed in the end, away from the second cylinder, of the first cylinder, the exhaust port is formed in the end, away from the first cylinder, of the second cylinder, an annular airflow chamber is formed between an inner peripheral surface of the first cylinder and an outer peripheral surface of the second cylinder, and the compressed gas input from the gas intake port enters the amplifying cavity after passing through the annular airflow chamber.

In the above solution, the first cylinder sleeves the second cylinder, which is simple in structure and convenient to assemble.

According to some embodiments of the present application, the first cylinder rotatably sleeves the second cylinder, an annular boss is formed on an inner wall of the first cylinder, an annular gap is formed between an end portion, located in the first cylinder, of the second cylinder and the annular boss and communicates with the annular airflow chamber, and the compressed gas in the annular airflow chamber enters the amplifying cavity through the annular gap.

In the above solution, an assembly length of the first cylinder and the second cylinder in the axial direction of the first cylinder is changed by rotating the first cylinder, such that the size of the annular gap can be adjusted, accordingly, a negative pressure value of the area of the tab, namely smoothing force on the tab is adjusted, thereby adapting to tabs of different thicknesses and shapes and first conveying rollers of different diameters.

According to some embodiments of the present application, the electrode plate conveying mechanism further includes: a first bracket and a second bracket, the second bracket is movably connected to the first bracket, the first conveying roller is rotatably connected to the first bracket, and the negative pressure supply unit is movably connected to the second bracket.

In the above solution, positioning support for the first conveying roller is realized through the first bracket, thereby ensuring stable conveying of the electrode plate by the first conveying roller. Positioning support for the negative pressure supply unit is realized through the second bracket, thereby forming the stable negative pressure environment around the tab.

According to some embodiments of the present application, the second bracket is provided with first strip-shaped holes extending in the thickness direction of the electrode plate. The electrode plate conveying mechanism further includes: first adjusting members, where the first adjusting members are connected to the negative pressure supply unit and movably penetrate through the first strip-shaped holes; and first locking members used for being connected to the first adjusting members so as to lock the negative pressure supply unit to the second bracket.

In the above solution, the positions of the first adjusting members in the first strip-shaped holes are changed, and the position of the negative pressure supply unit in the thickness direction of the electrode plate is adjusted, thereby adapting to electrode plates of different thicknesses and shapes, and first conveying rollers of different diameters.

According to some embodiments of the present application, the second bracket is provided with second strip-shaped holes extending in the axial direction of the first conveying roller. The electrode plate conveying mechanism further includes: second adjusting members which are connected to the first bracket and movably penetrate through the second strip-shaped holes; and second locking members which are used for being connected to the second adjusting members so as to lock the first bracket to the second bracket.

In the above solution, the positions of the second adjusting members in the second strip-shaped holes are changed, and the position of the negative pressure supply unit in the axial direction of the first conveying roller relative to the first bracket is adjusted, thereby adapting to electrode plates of different thicknesses and shapes, and first conveying rollers of different diameters.

According to some embodiments of the present application, the electrode plate includes a main body part and a tab protruding from the main body part. The first conveying roller includes a first roller section and a second roller section which are sequentially connected in the axial direction of the first conveying roller, the diameter of the first roller section is greater than that of the second roller section, the first roller section is used for conveying the main body part, and the second roller section is used for corresponding to the tab.

In the above solution, the diameter of the second roller section corresponding to the tab is smaller than the diameter of the first roller section corresponding to the main body part, the tab does not make contact with the second roller section, and when the electrode plate is fed onto the roller, the tab cannot impact on a roller surface of the second roller section and cannot damage the tab; and when the tab passes through the first conveying roller, the tab cannot scratch the roller surface of the second roller section, such that dust cannot be generated, thereby improving the quality of the electrode assembly constituted by the electrode plate.

According to some embodiments of the present application, a diameter difference between the first roller section and the second roller section is 2 mm to 10 mm.

In the above solution, the diameter difference between the first roller section and the second roller section is 2 mm to 10 mm, and a step is formed between the first roller section and the second roller section, which on one hand, can prevent the tab from impacting on the roller surface of the second roller section when the electrode plate is fed onto the roller, and on the other hand, can prevent, in a case of too large airflow at the tab, the tab from being folded towards the roller surface of the second roller section due to a supporting function of the second roller section on the tab.

According to some embodiments of the present application, the electrode plate conveying mechanism further includes: a second conveying roller that is arranged opposite to the first conveying roller, and a gap for the electrode plate to pass through is formed between the second conveying roller and the first conveying roller.

In the above solution, the second conveying roller and the first conveying roller are matched to convey the electrode plate, thereby ensuring stable conveying of the electrode plate.

According to some embodiments of the present application, the central axis of the negative pressure supply unit is parallel to the central axis of the first conveying roller, and is located between the first conveying roller and the second conveying roller.

In the above solution, the central axis of the negative pressure supply unit is located between the first conveying roller and the second conveying roller so as to ensure balanced two-side stress of the tab in the thickness direction and prevent the tab from being folded.

According to some embodiments of the present application, the length of the second conveying roller is smaller than that of the first conveying roller, and a projection of the second conveying roller on the electrode plate coincides with the first roller section.

In the above solution, the length of the second conveying roller is smaller than that of the first conveying roller, and the projection of the second conveying roller on the first conveying roller coincides with the first roller section, such that the second conveying roller is matched with the first conveying roller to ensure stable conveying of the electrode plate; and in addition, the second conveying roller does not make contact with the tab, such that the tab is prevented from scratching the roller surface of the second conveying roller, thereby avoiding damage to the tab.

According to some embodiments of the present application, the second conveying roller includes a third roller section corresponding to the first roller section and a fourth roller section corresponding to the second roller section, the fourth roller section is connected to the third roller section, the diameter of the fourth roller section is smaller than that of the third roller section, the third roller section is used for conveying the main body part, and the fourth roller section is used for corresponding to the tab.

In the above solution, the second conveying roller and the first conveying roller are the same in structural form, a space formed between the fourth roller section and the second roller section is used for accommodating the tab, and the tab does not make contact with the second roller section and the fourth roller section. But, when the airflow at the tab is too large, the second roller section and the fourth roller section can support the tab, thereby preventing the tab from being folded.

According to some embodiments of the present application, at least one of the first conveying roller and the second conveying roller is a driven roller.

In the above solution, at least one of the first conveying roller and the second conveying roller is the driven roller so as to convey the electrode plate.

In a second aspect, the present application provides an electrode plate conveying device, including: an unwinding mechanism used for unwinding an electrode plate; a winding mechanism used for winding the electrode plate; and the electrode plate conveying mechanism according to any above solution, which is arranged between the unwinding mechanism and the winding mechanism.

The above description is only a summary of the technical solutions of the present application. In order to understand the technical means of the present application more clearly, the technical means can be implemented according to the content of the specification. Furthermore, to make the above content and other objectives, features and advantages of the present application more comprehensible, specific implementations of the present application are exemplified below.

DESCRIPTION OF DRAWINGS

In order to illustrate the technical solutions of the embodiments of the present application more clearly, the drawings required in the embodiments of the present application are briefly introduced below. Obviously, the drawings described below are only some embodiments of the present application. For those of ordinary skill in the art, other drawings can also be obtained according to the drawings without any creative effort.

Figure 1:
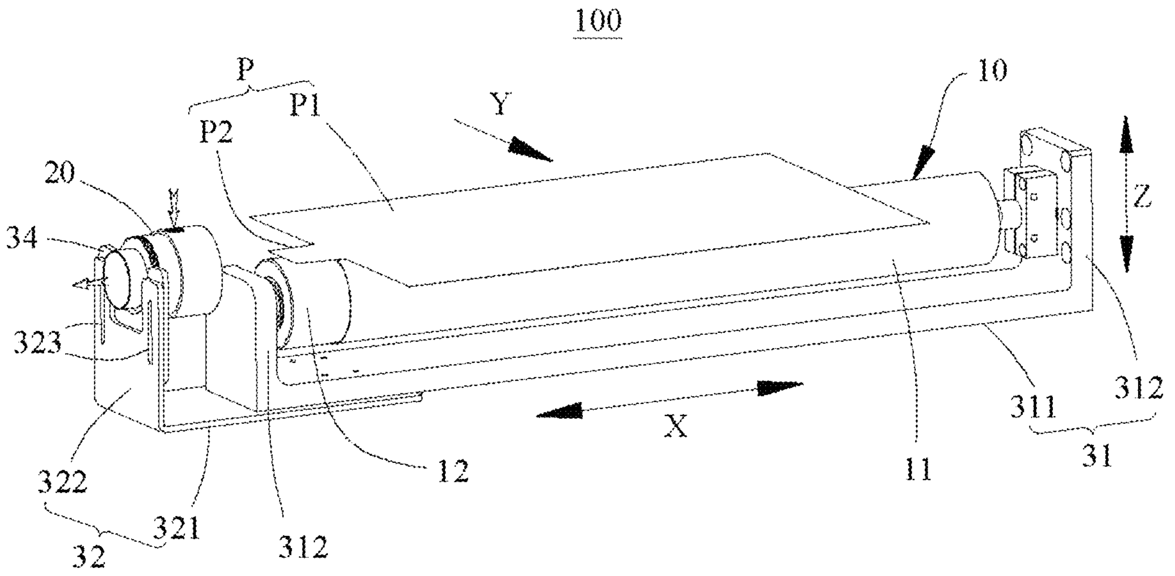
FIG. 1 is a schematic structural diagram of an electrode plate conveying mechanism according to some embodiments of the present application.

Description of reference numerals: 100—electrode plate conveying mechanism; 10—first conveying roller; 11—first roller section; 12—second roller section; 20—negative pressure supply unit; 21—airflow-guiding cavity; 22—amplifying cavity; 23—gas intake port; 24—suction port; 25—exhaust port; 26—first cylinder; 261—annular airflow chamber; 262—annular boss; 263—annular gap; 264—filleted corner; 27—second cylinder; 28—adjusting ring; 31—first bracket; 311—first bottom plate; 312—first side plate; 32—second bracket; 321—second bottom plate; 322—second side plate; 323—first strip-shaped hole; 324—second strip-shaped hole; 33—third bracket; 331—top plate; 332—third side plate; 34—mounting base; 411—first adjusting member; 412—first locking member; 421—second adjusting member; 422—second locking member; 50—second conveying roller; 51—third roller section; 52—fourth roller section; P-electrode plate; P1—main body part; and P2—tab.

DETAILED DESCRIPTION

The implementations of the present application are further described in detail below in combination with the drawings and embodiments. The detailed description of the following embodiments and the drawings are used to illustrate the principles of the present application by way of example, but should not be used to limit the scope of the present application, that is, the present application is not limited to the described embodiments.

The implementations of the present application are further described in detail below in combination with the drawings and embodiments. The detailed description of the following embodiments and the drawings are used to illustrate the principles of the present application by way of example, but should not be used to limit the scope of the present application, that is, the present application is not limited to the described embodiments.

Unless otherwise defined, all technical and scientific terms used herein have the same meaning as commonly understood by those skilled in the art belonging to the technical field of the present application; the terms used in the specification of the present application herein are only for the purpose of describing the specific embodiments and are not intended to limit the present application; and the terms "including" and "having" and any variations thereof in the specification and the claims of the present application and in the description of the drawings above are intended to cover non-exclusive inclusion.

A reference herein to "an embodiment" means that a particular feature, structure, or characteristic described in combination with the embodiments may be included in at least one embodiment of the present application. The appearance of this phrase in various places in the specification does not necessarily refer to the same embodiment, nor is it a separate or alternative embodiment that is mutually exclusive from other embodiments. It is explicitly and implicitly understood by those skilled in the art that the embodiments described herein may be combined with other embodiments.

It should be noted that similar numerals and letters denote similar items in the following figures, and therefore, once an item is defined in one figure, the item is not required to be further defined and explained in subsequent figures.

In the description of the present application, it is to be understood that orientation or position relationships indicated by terms "center", "length", "width", "thickness", "bottom", "inner", "outer", "circumferential direction", etc., are shown based on the drawings, are adopted not to indicate or imply that indicated apparatuses or members must be in specific orientations or structured and operated in specific orientations but only to conveniently describe the present application and simplify the description, and thus should not be understood as limits to the present application. In addition, the terms such as "first" and "second" in the specification and claims of the present application or the above drawings are used to distinguish different objects rather than describe particular orders, and may explicitly and implicitly include one or more features. In the description of the present application, "a plurality of" means two or more except as otherwise noted.

In the description of the present application, it should be noted that the terms "mounting", "connecting" and "connection" should be understood in a broad sense, unless otherwise explicitly specified or defined. For example, it may be a fixed connection, a detachable connection, or an integrated connection; it may be a mechanical connection or an electrical connection; and it may be a direct connection or an indirect connection through an intermediate medium, or may be a communication between the interiors of two elements. For those of ordinary skill in the art, the specific meanings of the above terms in the present application may be understood according to specific circumstances.

In this disclosure, the phrases "at least one of A, B, and C" and "at least one of A, B, or C" both mean only A, only B, only C, or any combination of A, B, and C.

In the present application, a battery cell may include a lithium-ion secondary battery, a lithium-ion primary battery, a lithium-sulfur battery, a sodium-lithium-ion battery, a sodium-ion battery, a magnesium-ion battery, or the like, which is not limited by the embodiments of the present application. The battery cell may be in a cylindrical, flat or rectangular solid shape or in other shapes, which is also not limited by the embodiments of the present application. The battery cells are generally divided into three types according to packaging manners: cylindrical battery cells, prismatic battery cells and pouch battery cells, which are also not limited by the embodiments of the present application.

The battery mentioned in the embodiments of the present application refers to a single physical module including one or more battery cells to provide a higher voltage and capacity. For example, the battery mentioned in the present application may include a battery module, or a battery pack, or the like. The battery generally includes a box body for encapsulating one or more battery cells. The box body can prevent liquids or other foreign matters from affecting the charging or discharging of the battery cells.

The battery cell includes an electrode assembly and an electrolyte solution, and the electrode assembly is composed of a positive electrode plate, a negative electrode plate and a separator. The battery cell operates mainly relying on movement of metal ions between the positive electrode plate and the negative electrode plate. The positive electrode plate includes a positive electrode current collector and a positive electrode active material layer. A surface of the positive electrode current collector is coated with the positive electrode active material layer. Current collectors not coated with the positive electrode active material layer protrude from the current collector coated with the positive electrode active material layer, and the current collectors not coated with the positive electrode active material layer serve as positive tabs. Taking a lithium-ion battery as an example, the material of the positive current collector may be aluminum, and the positive electrode active material may be lithium cobalt oxide, lithium iron phosphate, ternary lithium, lithium manganate, or the like. The negative electrode plate includes a negative electrode current collector and a negative electrode active material layer. A surface of the negative electrode current collector is coated with the negative electrode active material layer. Current collectors not coated with the negative electrode active material layer protrude from the current collector coated with the negative electrode active material layer, and the current collectors not coated with the negative electrode active material layer serve as negative tabs. The material of the negative electrode current collector may be copper, and the negative electrode active material may be carbon, silicon, or the like. In order to ensure that no fusing occurs when a large current passes, there are a plurality of positive tabs which are stacked together, and there are a plurality of negative tabs which are stacked together. The separator may be made from polypropylene (PP), polyethylene (PE), or the like.

The wound electrode assembly includes a positive electrode plate and a negative electrode plate wound in layers, and the separator is arranged between the positive electrode plate and the negative electrode plate to insulate and isolate the positive electrode plate and the negative electrode plate. The positive electrode plate and the negative electrode plate are roll materials. During the winding and forming process of the electrode assembly, both the positive electrode plate and the negative electrode plate are required to be transported to winding equipment. The electrode plate includes a main body part and tabs protruding from the main body part.

Before the electrode assembly is wound and formed, the electrode plate is required to be conveyed for a long distance and be transported by several electrode plate conveying mechanisms in a conveying process. In a high-speed (a linear speed being greater than 1.5 m/s) electrode plate conveying process, the tabs on an outer side of the electrode plate are affected by centrifugal force, eddy current wind resistance and other external forces, and as a result, are easily folded, resulting in affecting the quality of the electrode assembly and even scrapping.

Although in the related art, tab folding preventing or tab smoothing apparatuses are designed for the tab folding, most of the existing tab folding preventing or tab smoothing apparatuses perform smoothing through a guide block or a guide wheel mechanism, or attract and smooth the electrode plate through negative-pressure attraction inside rollers, the light and thin tabs are likely to collide with a guide device in a high-speed tab conveying state, resulting in cracking and damage of the tabs, or rub with the guide block to generate dust, which adheres to the surface of the electrode plate, affecting the quality of the electrode assembly, and even causing scrapping of the electrode assembly, and as a result, the production cost is high.

In view of this, in order to solve the problem of high production cost of the electrode assembly, the inventor has designed an electrode plate conveying mechanism after in-depth research. The electrode plate conveying mechanism includes a first conveying roller and a negative pressure supply unit. The first conveying roller is used for conveying an electrode plate, and the negative pressure supply unit is arranged on at least one end of the first conveying roller, is spaced apart from the first conveying roller in an axial direction of the first conveying roller, and is used for forming a negative pressure around a tab of the electrode plate so as to prevent the tab from being folded. The negative pressure supply unit changes the air pressure around the tab, so as to reduce tab folding.

By adopting the electrode plate conveying mechanism provided by this embodiment of the present application, at least one end of the first conveying roller is provided with the negative pressure supply unit, and the negative pressure is formed around the tab of the electrode plate by the negative pressure supply unit so as to reduce air resistance and then reduce the probability of tab folding; and in addition, the negative pressure supply unit is spaced apart from the first conveying roller in the axial direction of the first conveying roller so as to be prevented from rubbing with the tab and generating dust, thereby guaranteeing the product quality, increasing the material utilization rate and reducing the production cost.

A battery cell used by the electrode assembly composed of the electrode plate described in this embodiment of the present application may include a lithium-ion secondary battery, a lithium-ion primary battery, a lithium-sulfur battery, a sodium-ion battery, a magnesium-ion battery, or the like, which is limited in this embodiment of the present application.

According to some embodiments of the present application, please refer to FIG. 1, and FIG. 1 illustrates a schematic structural diagram of an electrode plate conveying mechanism 100 according to some embodiments of the present application. As shown in FIG. 1, the present application provides an electrode plate conveying mechanism 100, which includes a first conveying roller 10 and a negative pressure supply unit 20. The first conveying roller 10 is used for conveying an electrode plate P. The negative pressure supply unit 20 is arranged on at least one end of the first conveying roller 10, is spaced apart from the first conveying roller 10 in an axial direction X of the first conveying roller 10, and is used for forming a negative pressure around a tab P2 of the electrode plate P so as to prevent the tab P2 from being folded.

In the figure, the direction indicated by the letter X is the axial direction of the first conveying roller 10, the direction indicated by the letter Y is the belt running direction of the electrode plate P, and the direction indicated by the letter Z is the thickness direction Z of the electrode plate P. The axial direction X of the first conveying roller 10, the belt running direction Y of the electrode plate P, and the thickness direction Z of the electrode plate P are perpendicular to each other.

The first conveying roller 10 is a roller for conveying the electrode plate P, which can carry the electrode plate P, and assist belt running of the electrode plate P.

The negative pressure supply unit 20 is arranged on at least one end of the first conveying roller 10, which may be that the negative pressure supply unit 20 is arranged at one end of the first conveying roller 10, or the negative pressure supply units 20 may be arranged at two opposite ends of the first conveying roller 10. The electrode plate P includes a main body part P1 and a tab P2 protruding from the main body part P1. When the electrode plate P has one tab P2, the tab P2 is located on one side edge of the main body part P1, and the negative pressure supply unit 20 may be arranged at the end, corresponding to the position of the tab P2, of the first conveying roller 10. When there are two tabs P2 and are located on two opposite side edges of the main body part P1, the negative pressure supply units 20 may be arranged at two ends of the first conveying roller 10 to correspond to the two tabs P2.

The negative pressure supply unit 20 is a component used for forming the negative pressure around the tab P2 of the electrode plate P. For example, the negative pressure supply unit 20 may extract, in the axial direction X of the first conveying roller 10, air around the tab P2, and guide the air around the tab P2 to flow, such that force exerted on the two sides, in the thickness direction Z, of the tab P2 is balanced to prevent the tab P2 from being folded. In other words, the negative pressure supply unit 20 may create the negative pressure around the tab P2, and smooth the tab P2 through the airflow. It should be noted that a central axis of the negative pressure supply unit 20 is coplanar with a conveying plane of the electrode plate P. In other words, when the negative pressure supply unit 20 supplies the negative pressure, an air flow direction is perpendicular to the belt running direction Y of the electrode plate P, a center of an air flow path is located on the conveying plane of the electrode plate P, that is, when the negative pressure supply unit 20 works, the air around the tab P2 is extracted towards the negative pressure supply unit 20, such that the tab P2 is in an unfolded state, and a corner of the tab P2 cannot be folded.

The negative pressure supply unit 20 is spaced apart from the first conveying roller 10, such that an area for guiding air flow is formed between the first conveying roller 10 and the negative pressure supply unit 20, and accordingly, the negative pressure is formed around the tab P2.

According to the electrode plate conveying mechanism 100 provided by this embodiment of the present application, at least one end of the first conveying roller 10 is provided with the negative pressure supply unit 20, and the negative pressure is formed around the tab P2 of the electrode plate P by the negative pressure supply unit 20 so as to reduce air resistance and then reduce the probability of folding of the tab P2; and in addition, the negative pressure supply unit 20 is spaced apart from the first conveying roller 10 in the axial direction X of the first conveying roller 10 so as to be prevented from rubbing with the tab P2 and generating dust, thereby guaranteeing the product quality, increasing the material utilization rate and reducing the production cost.

Figure 2:
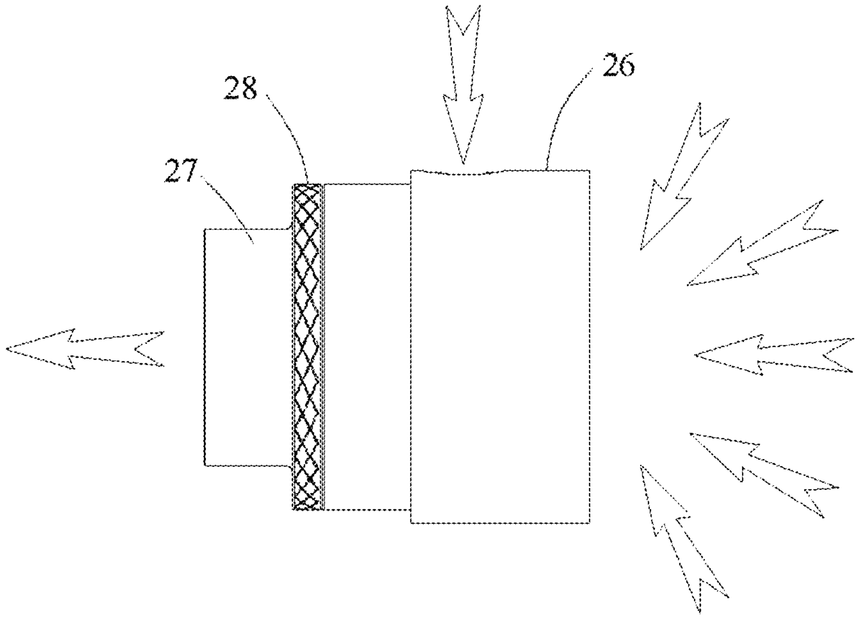
FIG. 2 is a working principle diagram of a negative pressure supply unit according to some embodiments of the present application.
Figure 3:
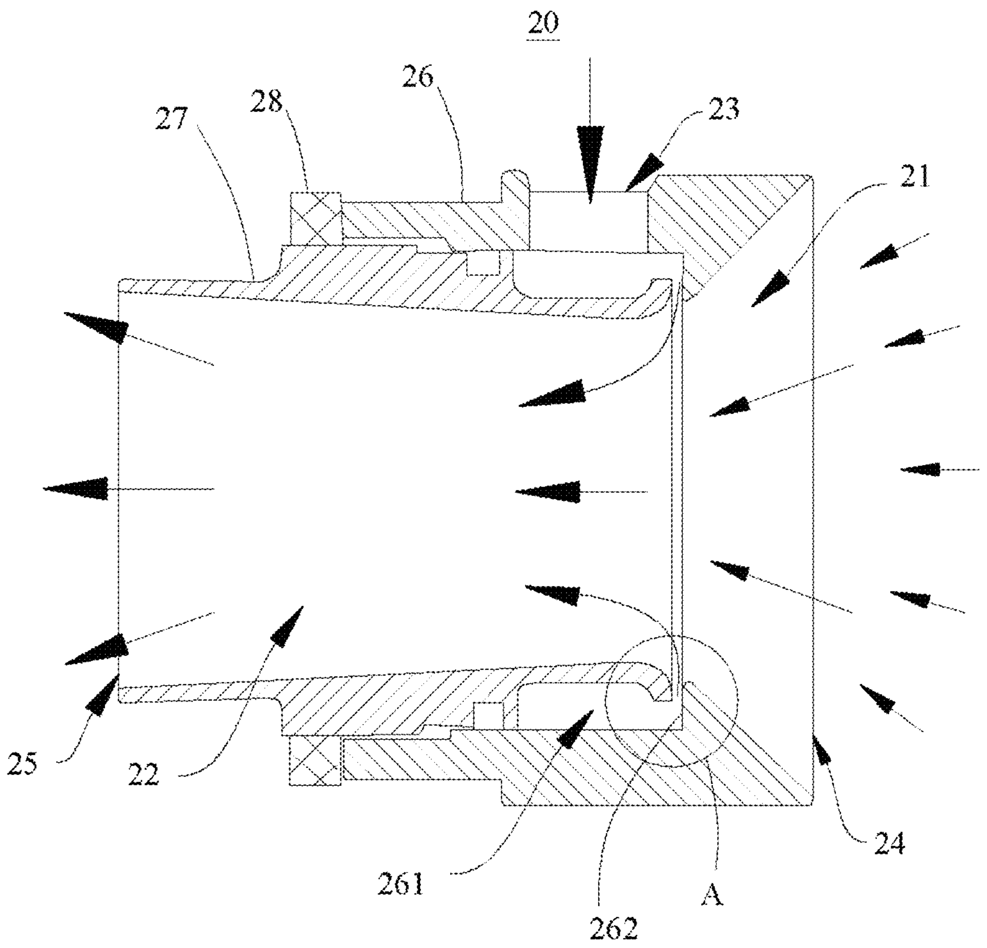
FIG. 3 is a cross-sectional view of a negative pressure supply unit according to some embodiments of the present application.
Figure 4:
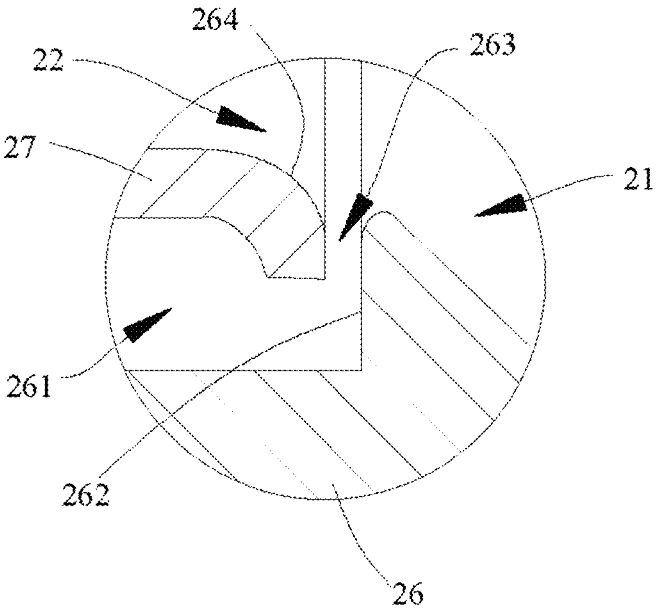
FIG. 4 is a partial enlarged view of a position A in FIG. 3.

Please refer to FIG. 2 to FIG. 4, FIG. 2 illustrates a working principle diagram of a negative pressure supply unit 20 according to some embodiments of the present application, FIG. 3 illustrates a cross-sectional view of a negative pressure supply unit 20 according to some embodiments of the present application, and illustrates an airflow distribution situation, and FIG. 4 is a partial enlarged view of a position A in FIG. 3. According to some embodiments of the present application, optionally, as shown in FIG. 2 to FIG. 4, the negative pressure supply unit 20 is an air amplifier. The air amplifier includes an airflow-guiding cavity 21, an amplifying cavity 22 communicating with the airflow-guiding cavity 21, and a gas intake port 23 used for conveying compressed gas to the amplifying cavity 22. The airflow-guiding cavity 21 is close to the first conveying roller 10 relative to the amplifying cavity 22, the airflow-guiding cavity 21 is provided with a suction port 24 facing the first conveying roller 10, the amplifying cavity 22 is provided with an exhaust port 25 facing away from the first conveying roller 10, and the compressed gas is used for establishing the negative pressure, such that the airflow-guiding cavity 21 guides, through the suction port 24, outside gas into the amplifying cavity 22.

The working principle of the air amplifier is based on the basic principle of fluid mechanics-Coanda effect, only a small amount of compressed gas is used as a power source, and the negative pressure is formed at the intersection of the airflow-guiding cavity 21 and the amplifying cavity 22, driving the surrounding air to flow, such that the airflow-guiding cavity 21 guides, through the suction port 24, the outside gas to the amplifying cavity 22, high-pressure and high-speed airflow is formed at the exhaust port 25, and the flow of the exhaust port 25 of the air amplifier may be tens of times that of the compressed gas input from the gas intake port 23.

The negative pressure supply unit 20 is the air amplifier, a small part of compressed gas is input through the gas intake port 23, such that the airflow-guiding cavity 21 guides, through the suction port 24, tens of times of outside gas into the amplifying cavity 22 to be exhausted, thereby forming a functional area with one side for blowing and the other side for suction. By utilizing characters of the air amplifier, the air around the tab P2 may be guided to the exhaust port 25 of the amplifying cavity 22, such that the local negative pressure is formed around the tab P2, the air resistance is reduced, then, the probability of folding of the tab P2 is reduced, and the material utilization rate is increased. The negative pressure supply unit 20 is the air amplifier, which is simple in structure and small in occupied space, is only driven by the compressed gas, and is low in energy consumption and safe in use.

According to some embodiments of the present application, optionally, as shown in FIG. 2 to FIG. 4, the air amplifier includes a first cylinder 26 and a second cylinder 27, the second cylinder 27 is sleeved with part of the first cylinder 26, the amplifying cavity 22 is formed in the second cylinder 27, a part, not sleeving the second cylinder 27, of the first cylinder 26 forms the airflow-guiding cavity 21, the gas intake port 23 is formed in an outer peripheral surface of the first cylinder 26 and penetrates through the first cylinder 26, the suction port 24 is formed in the end, away from the second cylinder 27, of the first cylinder 26, the exhaust port 25 is formed in the end, away from the first cylinder 26, of the second cylinder 27, an annular airflow chamber 261 is formed between an inner peripheral surface of the first cylinder 26 and an outer peripheral surface of the second cylinder 27, and the compressed gas input from the gas intake port 23 enters the amplifying cavity 22 after passing through the annular airflow chamber 261.

Both the first cylinder 26 and the second cylinder 27 are of cylindrical structures with openings in both ends, and the second cylinder 27 is sleeved with one end of the first cylinder 26, such that part of the first cylinder 26 and part of the second cylinder 27 are overlapped. The opening in the end, away from the second cylinder 27, of the first cylinder 26 is the suction port 24, and the opening in the end, away from the first cylinder 26, of the second cylinder 27 is the exhaust port 25.

A concave portion may be formed by the outer peripheral surface of the end, located in the first cylinder 26, of the second cylinder 27, such that the annular airflow chamber 261 is formed between the outer peripheral surface of the second cylinder 27 and the inner peripheral surface of the first cylinder 26. The annular airflow chamber 261 communicates with the gas intake port 23 and the amplifying cavity 22, the compressed gas enters the annular airflow chamber 261 through the gas intake port 23, and flows from the annular airflow chamber 261 to the amplifying cavity 22, and after the compressed gas flows out from the annular airflow chamber 261, a negative pressure area is formed between the amplifying cavity 22 and the airflow-guiding cavity 21 to guide the gas around the suction port 24 to enter the amplifying cavity 22 from the airflow-guiding cavity 21.

The first cylinder 26 sleeves the second cylinder 27, which is simple in structure and convenient to assemble.

According to some embodiments of the present application, optionally, as shown in FIG. 2 to FIG. 4, the first cylinder 26 rotatably sleeves the second cylinder 27, an annular boss 262 is formed on an inner wall of the first cylinder 26, an annular gap 263 is formed between an end portion, located in the first cylinder 26, of the second cylinder 27 and the annular boss 262 and communicates with the annular airflow chamber 261, and the compressed gas in the annular airflow chamber 261 enters the amplifying cavity 22 through the annular gap 263.

The annular gap 263 being a gap formed between the end portion, located in the first cylinder 26, of the second cylinder 27 and the annular boss 262 may be understood as an area, in an axial direction of the first cylinder 26, between the end portion of the second cylinder 27 and the annular boss 262. The annular gap 263 is located between the amplifying cavity 22 and the airflow-guiding cavity 21.

The compressed gas flows towards the amplifying cavity 22 after flowing out of the annular gap 263, a negative pressure environment is formed by the area between the amplifying cavity 22 and the airflow-guiding cavity 21, and the outside gas around an airflow-guiding port is guided into the airflow-guiding cavity 21 and flows towards the amplifying cavity 22.

An assembly length of the first cylinder 26 and the second cylinder 27 in the axial direction of the first cylinder 26 is changed by rotating the first cylinder 26, such that the size of the annular gap 263 can be adjusted, accordingly, a negative pressure value of the area of the tab P2, namely smoothing force on the tab P2 is adjusted, thereby adapting to tabs P2 different in thickness and shape and first conveying rollers 10 different in diameter.

It should be noted that the first cylinder 26 and the second cylinder 27 are in a rotation seal fit. In other words, the compressed gas entering the annular airflow chamber 261 through the gas intake port 23 can enter the amplifying cavity 22 only through the annular gap 263.

Optionally, a filleted corner 264 is formed between an end surface of the end, located in the first cylinder 26, of the second cylinder 27 and an inner surface, such that the gas flowing out of the annular gap 263 flows into the amplifying cavity 22.

According to some embodiments of the present application, optionally, as shown in FIG. 2 and FIG. 3, the air amplifier further includes an adjusting ring 28, and the adjusting ring 28 sleeves the second cylinder 27, is connected to the first cylinder 26, and is in threaded connection to the second cylinder 27.

The adjusting ring 28 may be rotated to drive the first cylinder 26 to rotate relative to the second cylinder 27, and meanwhile, the size of the annular gap 263 can be changed so as to change the air output of the annular gap 263, thereby adjusting the air input of the suction port 24.

Figure 5:
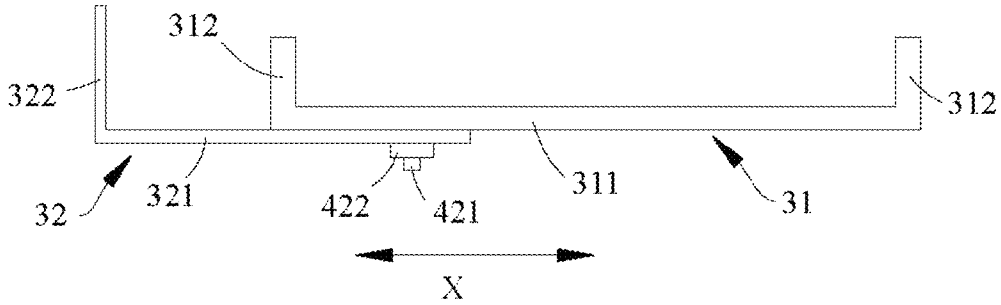
FIG. 5 is a schematic diagram of the assembly of a first bracket and a second bracket according to some embodiments of the present application.
Figure 6:
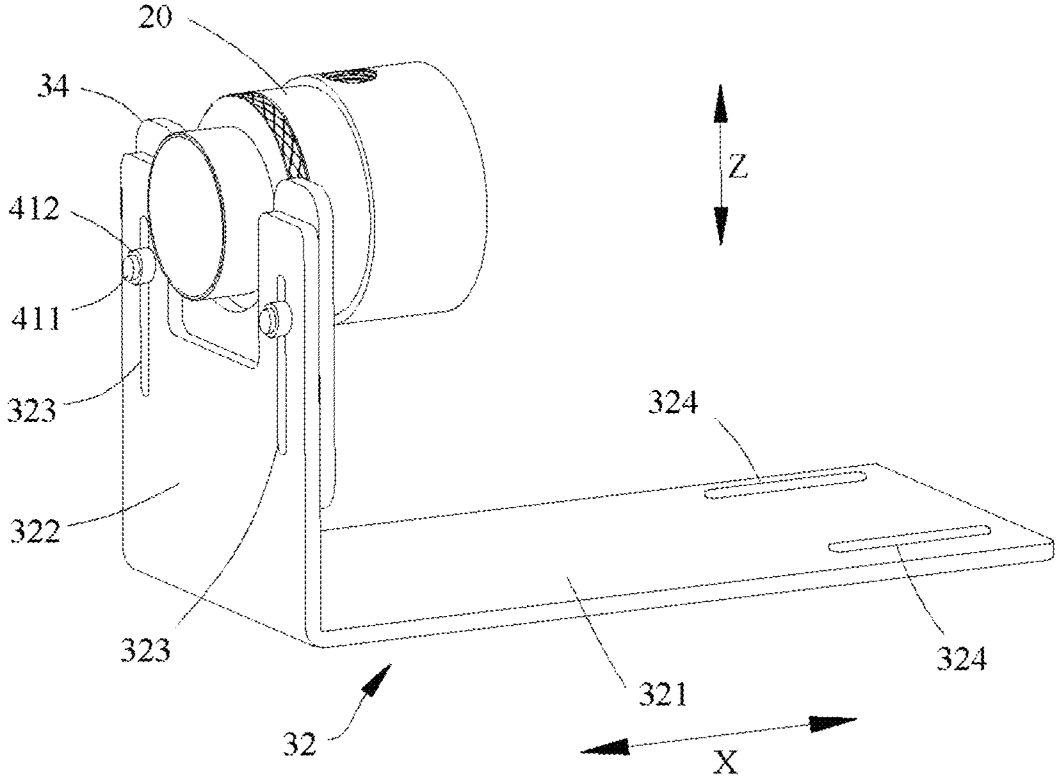
FIG. 6 is a schematic diagram of the assembly of a negative pressure supply unit and a second bracket according to some embodiments of the present application.

Please refer to FIG. 5 and FIG. 6, FIG. 5 illustrates a schematic diagram of the assembly of a first bracket 31 and a second bracket 32 according to some embodiments of the present application, and FIG. 6 illustrates a schematic diagram of the assembly of a negative pressure supply unit 20 and a second bracket 32 according to some embodiments of the present application. According to some embodiments of the present application, optionally, as shown in FIG. 1, FIG. 5 and FIG. 6, the electrode plate conveying mechanism 100 further includes: the first bracket 31 and the second bracket 32, the second bracket 32 is movably connected to the first bracket 31, the first conveying roller 10 is rotatably connected to the first bracket 31, and the negative pressure supply unit 20 is movably connected to the second bracket 32.

The first bracket 31 is a component used for providing support for the first conveying roller 10, the first conveying roller 10 is rotatably connected to the first bracket 31, and the first conveying roller 10 can rotate relative to the first bracket 31. Both ends of the first conveying roller 10 may be respectively connected to the first bracket 31, or one end of the first conveying roller 10 is connected to the first bracket 31.

Optionally, as shown in FIG. 1 and FIG. 5, the first bracket 31 may be of a U-shaped structure, the first bracket 31 includes a first bottom plate 311 and first side plates 312 connected to two opposite ends of the first bottom plate 311, and the first conveying roller 10 is located between the two first side plates 312, and is rotatably connected to the two first side plates 312. The first side plates 312 and the first bottom plate 311 may be arranged separately, and connected together by connectors (bolts, rivets, etc.), or fixed together by welding; and the first side plates 312 and the first bottom plate 311 may also be integrally formed, such as integral casting or plate bending, which is not limited in the present application.

The second bracket 32 is a component used for providing support for the negative pressure supply unit 20. The negative pressure supply unit 20 is movably connected to the second bracket 32, and can move relative to the second bracket 32 so as to change the position of the negative pressure supply unit 20 relative to the first conveying roller 10. The second bracket 32 is movably connected to the first bracket 31, and the second bracket 32 can move relative to the first bracket 31 so as to change the position of the negative pressure supply unit 20 relative to the first conveying roller 10.

Optionally, as shown in FIG. 1, FIG. 5 and FIG. 6, the second bracket 32 includes a second bottom plate 321 and a second side plate 322 connected to the second bottom plate 321, the second side plate 322 is parallel to the first side plates 312, the second bottom plate 321 is connected to the first bottom plate 311, and the negative pressure supply unit 20 is arranged on the second side plate 322. The second side plate 322 and the second bottom plate 321 form an L-shaped structure. The second side plate 322 and the second bottom plate 321 may be arranged separately, and connected together by connectors (bolts, rivets, etc.), or fixed together by welding; and the second side plate 322 and the second bottom plate 321 may also be integrally formed, such as integral casting or plate bending, which is not limited in the present application.

In order to facilitate the connection between the negative pressure supply unit 20 and the second bracket 32, the negative pressure supply unit 20 is connected to the second bracket 32 through a mounting base 34. As shown in the figure, the negative pressure supply unit 20 is fixed to the mounting base 34, and the mounting base 34 is connected to the second side plate 322.

In order to reduce space occupation, the mounting base 34 may be a flat plate, which is parallel to the second side plate 322.

Positioning support for the first conveying roller 10 is realized through the first bracket 31, thereby ensuring stable conveying of the electrode plate P by the first conveying roller 10. Positioning support for the negative pressure supply unit 20 is realized through the second bracket 32, thereby forming the stable negative pressure environment around the tab P2.

In the manufacturing process of the electrode assembly, electrode plates P of different thicknesses and shapes, and first conveying rollers 10 of different roller diameters will affect the smoothing effect of the negative pressure supply unit 20 on the tab P2. The relative position of the negative pressure supply unit 20 and the tab P2 is required to be adjusted according to the electrode plates P of different thicknesses and shapes, and the first conveying rollers 10 of different roller diameters, thereby guaranteeing the negative pressure supplied by the negative pressure supply unit 20 and preventing the tab P2 from being folded. The following embodiments describe the manner of adjusting the position of the negative pressure supply unit 20.

According to some embodiments of the present application, optionally, as shown in FIG. 1 and FIG. 6, the second bracket 32 is provided with first strip-shaped holes 323 extending in the thickness direction Z of the electrode plate P. The electrode plate conveying mechanism 100 further includes: first adjusting members 411, where the first adjusting members 411 are connected to the negative pressure supply unit 20 and movably penetrate through the first strip-shaped holes 323; and first locking members 412 used for being connected to the first adjusting members 411 so as to lock the negative pressure supply unit 20 to the second bracket 32.

The first strip-shaped holes 323 extend in the thickness direction Z of the electrode plate P, the first adjusting members 411 movably penetrate through the first strip-shaped holes 323, and the first adjusting members 411 can move in the thickness direction Z of the electrode plate P relative to the second bracket 32, thereby changing the position, in the thickness direction Z of the electrode plate P, of the negative pressure supply unit 20 connected to the first adjusting members 411, and then changing a distance between the negative pressure supply unit 20 and the first conveying roller 10 in the thickness direction of the tab P2.

The positions of the first adjusting members 411 in the first strip-shaped holes 323 are changed, and the position of the negative pressure supply unit 20 in the thickness direction Z of the electrode plate P is adjusted, thereby adapting to electrode plates P of different thicknesses and shapes, and first conveying rollers 10 of different diameters.

According to some embodiments of the present application, optionally, as shown in FIG. 6, the two first strip-shaped holes 323 are formed in the second side plate 322 and are distributed at intervals in the belt running direction Y of the electrode plate P, the first adjusting members 411 may be rod members with threaded sections, and the first locking members 412 may be nuts. Each first adjusting member 411 is provided with a first end and a second end which are oppositely arranged, where the first end is fixed to the mounting base 34. The threaded sections are at least arranged at the second ends, and the second ends are in threaded connection to the first locking members 412 after penetrating through the first strip-shaped holes 323. The structure is simple, and the assembly is convenient.

According to some embodiments of the present application, optionally, as shown in FIG. 5 and FIG. 6, the second bracket 32 is provided with second strip-shaped holes 324 extending in the axial direction X of the first conveying roller 10. The electrode plate conveying mechanism 100 further includes: second adjusting members 421 which are connected to the first bracket 31 and movably penetrate through the second strip-shaped holes 324; and second locking members 422 which are used for being connected to the second adjusting members 421 so as to lock the first bracket 31 to the second bracket 32.

The second strip-shaped holes 324 extend in the axial direction X of the first conveying roller 10, the second adjusting members 421 movably penetrate through the second strip-shaped holes 324, and the second adjusting members 421 can move in the axial direction X of the first conveying roller 10 relative to the second bracket 32, thereby changing the position, in the axial direction X of the first conveying roller 10, of the first bracket 31 connected to the second adjusting members 421, and then changing a distance between the negative pressure supply unit 20 and the first conveying roller 10 in the axial direction X of the first conveying roller 10.

The positions of the second adjusting members 421 in the second strip-shaped holes 324 are changed, and the position of the negative pressure supply unit 20 in the axial direction X of the first conveying roller 10 relative to the first bracket 31 is adjusted, thereby adapting to electrode plates P of different thicknesses and shapes, and first conveying rollers 10 of different diameters.

According to some embodiments of the present application, optionally, as shown in FIG. 6, the two second strip-shaped holes 324 are formed in the second bottom plate 321 and are arranged at intervals in the belt running direction Y (please refer to FIG. 1) of the electrode plate P, the second adjusting members 421 may be rod members with threaded sections, and the second locking members 422 may be nuts. Each second adjusting member 421 is provided with a third end and a fourth end which are oppositely arranged, where the third end is fixed to the first bottom plate 311 of the first bracket 31. The threaded sections are at least arranged at the fourth ends, and the fourth ends are in threaded connection to the second locking members 422 after penetrating through the second strip-shaped holes 324. The structure is simple, and the assembly is convenient.

According to some embodiments of the present application, optionally, as shown in FIG. 1, the electrode plate P includes the main body part P1 and the tab P2 protruding from the main body part P1. The first conveying roller 10 includes a first roller section 11 and a second roller section 12 which are sequentially connected in the axial direction of the first conveying roller 10, the diameter of the first roller section 11 is greater than that of the second roller section 12, the first roller section 11 is used for conveying the main body part P1, and the second roller section 12 is used for corresponding to the tab P2.

The first roller section 11 and the second roller section 12 are two parts of the first conveying roller 10 distributed sequentially in the axial direction X of the first conveying roller 10, are arranged coaxially, and are different in diameter, and a step is formed between the first roller section 11 and the second roller section 12.

When the electrode plate P is conveyed to the first conveying roller 10, the main body part P1 is carried by the first roller section 11, and since the diameter of the second roller section 12 is smaller than that of the first roller section 11, the tab P2 does not make contact with the second roller section 12.

The diameter of the second roller section 12 corresponding to the tab P2 is smaller than the diameter of the first roller section 11 corresponding to the main body part P1, the tab P2 does not make contact with the second roller section 12, and when the electrode plate P is fed onto the roller, the tab P2 cannot impact on a roller surface of the second roller section 12 and cannot damage the tab P2; and when the tab P2 passes through the first conveying roller 10, the tab P2 cannot scratch the roller surface of the second roller section 12, such that dust cannot be generated, thereby improving the quality of the electrode assembly constituted by the electrode plate P.

According to some embodiments of the present application, optionally, a diameter difference between the first roller section 11 and the second roller section 12 is 2 mm to 10 mm.

The diameter difference between the first roller section 11 and the second roller section 12 is 2 mm to 10 mm, and the step is formed between the first roller section 11 and the second roller section 12, which on one hand, can prevent the tab P2 from impacting on the roller surface of the second roller section 12 when the electrode plate P is fed onto the roller, and on the other hand, can prevent, in a case of too large airflow at the tab P2, the tab P2 from being folded towards the roller surface of the second roller section 12 due to a supporting function of the second roller section 12 on the tab P2 When the diameter difference between the first roller section 11 and the second roller section 12 is small, the tab P2 is more likely to impact on the roller surface of the second roll section 12 when the electrode plate P is fed onto the roller, which may easily cause damage to the tab P2. When the diameter difference between the first roller section 11 and the second roller section 12 is large, and the airflow at the tab P2 is too large, due to the large distance between the tab P2 and the second roller section 12, the tab P2 is more likely to be folded towards the roller surface of the second roller section 12 due to the lack of the support from the second roller section 12.

Figure 7:
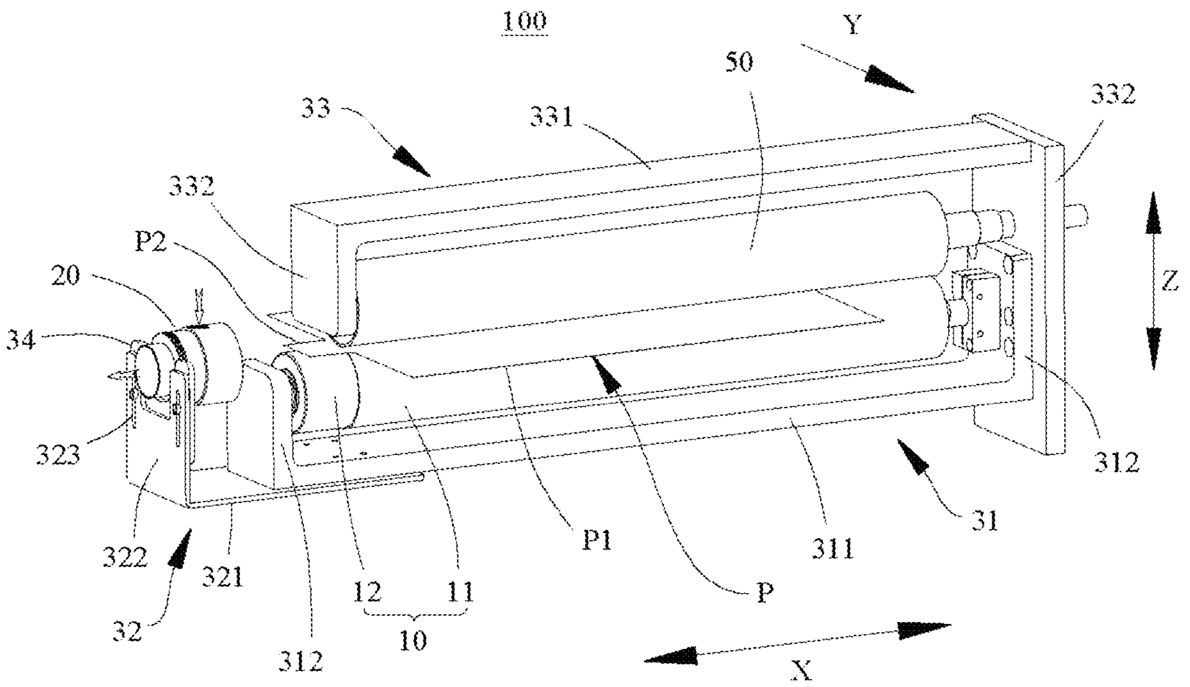
FIG. 7 is a schematic structural diagram of an electrode plate conveying mechanism according to some other embodiments of the present application.

Please refer to FIG. 7, and FIG. 7 illustrates a schematic structural diagram of an electrode plate conveying mechanism 100 according to some other embodiments of the present application. According to some embodiments of the present application, optionally, as shown in FIG. 7, the electrode plate conveying mechanism 100 further includes: a second conveying roller 50 that is arranged opposite to the first conveying roller 10, and a gap for the electrode plate P to pass through is formed between the second conveying roller 50 and the first conveying roller 10.

The second conveying roller 50 is arranged opposite to the first conveying roller 10, and the second conveying roller 50 and the first conveying roller 10 are located on both sides in the thickness direction Z of the electrode plate P. In other words, the second conveying roller 50 and the first conveying roller are parallel, and there is the gap between the second conveying roller 50 and the first conveying roller 10 for the electrode plate P to pass through. Optionally, the distance between the second conveying roller 50 and the first conveying roller 10 is adjustable, so as to facilitate the threading of the electrode plate P or the removal of the electrode plate P.

The second conveying roller 50 and the first conveying roller 10 are matched to convey the electrode plate P, thereby ensuring stable conveying of the electrode plate P.

Optionally, as shown in FIG. 7, the electrode plate conveying mechanism 100 further includes a third bracket 33, the third bracket 33 is connected to the first bracket 31, and the second conveying roller 50 is rotatably connected to the third bracket 33, such that the positioning support for the second conveying roller 50 is realized. The third bracket 33 is of a U-shaped structure, and includes a top plate 331 and third side plates 332 connected to two opposite ends of the top plate 331, where one third side plate 332 is connected to one first side plate 312, the second conveying roller 50 is located between the two third side plates 332, the top plate 331 is located on the side, away from the first conveying roller 10, of the second conveying roller 50, and the second conveying roller 50 is rotatably connected to the two third side plates 332, such that the second conveying roller 50 can rotate relative to the two third side plates 332. The third side plates 332 and the top plate 331 may be arranged separately, and connected together by connectors (bolts, rivets, etc.), or fixed together by welding; and the second side plates 332 and the top plate 331 may also be integrally formed, such as integral casting or plate bending, which is not limited in the present application.

It should be noted that the size of the third side plate 332 connected to the first side plate 312 is greater than the size of the other third side plate 332. For example, the length, width and thickness of the third side plate 332 connected to the first side plate 312 are all greater than those of the other third side plate 332, so as to enhance the connection strength between the third side plate 332 and the first side plate 312.

According to some embodiments of the present application, optionally, the central axis of the negative pressure supply unit 20 is parallel to the central axis of the first conveying roller 10, and is located between the first conveying roller 10 and the second conveying roller 50.

The central axis of the negative pressure supply unit 20 refers to a center line of a flow path of airflow when the negative pressure supply unit 20 provides the negative pressure, and may also be a central axis of the suction port 24 of the negative pressure supply unit 20. The central axis of the negative pressure supply unit 20 is located between the first conveying roller 10 and the second conveying roller 50, the distance between the central axis of the negative pressure supply unit 20 and the central axis of the first conveying roller 10 may be equal to the distance between the central axis of the negative pressure supply unit 20 and the central axis of the second conveying roller 50, or the distance between the central axis of the negative pressure supply unit 20 and the central axis of the first conveying roller 10 may be smaller than the distance between the central axis of the negative pressure supply unit 20 and the central axis of the second conveying roller 50, or the distance between the central axis of the negative pressure supply unit 20 and the central axis of the first conveying roller 10 may be greater than the distance between the central axis of the negative pressure supply unit 20 and the central axis of the second conveying roller 50.

The central axis of the negative pressure supply unit 20 is located between the first conveying roller 10 and the second conveying roller 50 so as to ensure balanced two-side stress of the tab P2 in the thickness direction and prevent the tab P2 from being folded.

According to some embodiments of the present application, optionally, as shown in FIG. 7, the length of the second conveying roller 50 is smaller than that of the first conveying roller 10, and a projection of the second conveying roller 50 on the electrode plate P coincides with the first roller section 11.

The length of the second conveying roller 50 is smaller than that of the first conveying roller 10, and the projection of the second conveying roller 50 on the first conveying roller 10 coincides with the first roller section 11, such that the second conveying roller 50 is matched with the first conveying roller 10 to ensure stable conveying of the electrode plate P; and in addition, the second conveying roller 50 does not make contact with the tab P2, such that the tab P2 is prevented from scratching the roller surface of the second conveying roller 50, thereby avoiding damage to the tab P2.

Figure 8:
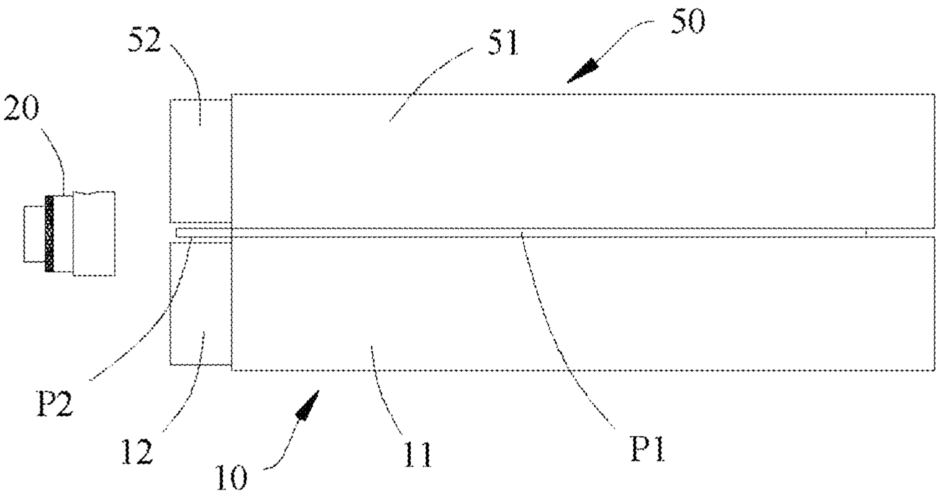
FIG. 8 is a schematic diagram of cooperation between the second conveying roller and the first conveying roller according to some embodiments of the present application; and in the drawings, the drawings are not drawn to actual scale.

Please refer to FIG. 8, and FIG. 8 illustrates a schematic diagram of cooperation between the second conveying roller 50 and the first conveying roller 10 according to some embodiments of the present application. According to some embodiments of the present application, optionally, as shown in FIG. 8, the second conveying roller 50 includes a third roller section 51 corresponding to the first roller section 11 and a fourth roller section 52 corresponding to the second roller section 12, the fourth roller section 52 is connected to the third roller section 51, the diameter of the fourth roller section 52 is smaller than that of the third roller section 51, the third roller section 51 is used for conveying the main body part P1, and the fourth roller section 52 is used for corresponding to the tab P2.

The second conveying roller 50 and the first conveying roller 10 are the same in structural form, a space formed between the fourth roller section 52 and the second roller section 12 is used for accommodating the tab P2, and the tab P2 does not make contact with the second roller section 12 and the fourth roller section 52. But, when the airflow at the tab P2 is too large, the second roller section 12 and the fourth roller section 52 can support the tab P2, thereby preventing the tab P2 from being folded.

According to some embodiments of the present application, optionally, at least one of the first conveying roller 10 and the second conveying roller 50 is a driven roller.

One of the first conveying roller 10 and the second conveying roller 50 may be the driven roller, and the other one is a driving roller with a power drive structure. For example, the first conveying roller 10 may be the driven roller, the second conveying roller 50 may be the driving roller, the second conveying roller 50 may drive the electrode plate P to move, and the first conveying roller 10 is driven by the electrode plate P to rotate around the central axis of the first conveying roller 10. Both the first conveying roller 10 and the second conveying roller 50 may be driven rollers, and both the first conveying roller 10 and the second conveying roller 50 are driven by the electrode plate P to rotate.

At least one of the first conveying roller 10 and the second conveying roller 50 is the driven roller so as to convey the electrode plate P.

In other embodiments, both the first conveying roller 10 and the second conveying roller 50 may also be driving rollers, however, it is needed to ensure that the first conveying roller 10 and the second conveying roller 50 are the same in diameter and rotational speed, so as to avoid wrinkling of the electrode plate P.

According to some embodiments of the present application, the present application further provides an electrode plate forming device, including an unwinding mechanism, a winding mechanism, and the electrode plate conveying mechanism 100 provided in any of the foregoing embodiments. The unwinding mechanism is used for unwinding the electrode plate P, the winding mechanism is used for winding the electrode plate P, and the electrode plate conveying mechanism 100 is arranged between the unwinding mechanism and the winding mechanism.

There may be more electrode plate conveying mechanisms 100, so as to ensure stable conveying of the electrode plate P, ensure the conveying quality of the electrode plate P, and prevent the tab P2 from being folded.

According to some embodiments of the present application, please refer to FIG. 1 to FIG. 8, the present application provides an electrode plate conveying mechanism 100, including a first conveying roller 10, a negative pressure supply unit 20, a first bracket 31 and a second bracket 32. The first conveying roller 10 is used for conveying an electrode plate P, and the electrode plate P includes a main body part P1 and a tab P2 protruding from the main body part P1. The first conveying roller 10 includes a first roller section 11 and a second roller section 12, the diameter of the first roller section 11 is greater than that of the second roller section 12, and when the first roller section 11 is used for conveying the main body part P1, the second roller section 12 is used for corresponding to the tab P2, and the tab P2 does not make contact with the second roller section 12. The negative pressure supply unit 20 is an air amplifier. The air amplifier is arranged at the end, corresponding to the tab P2, of the first conveying roller 10. The air amplifier is spaced apart from the first conveying roller 10 in the axial direction X of the first conveying roller 10. The first conveying roller 10 is rotatably connected to the first bracket 31, the air amplifier is movably connected to the second bracket 32, and the second bracket 32 is movably connected to the first bracket 31. The air amplifier may move relative to the second bracket 32 in the thickness direction Z of the electrode plate P to change the distance between the air amplifier and the tab P2 in the thickness direction of the tab P2. The second bracket 32 may move relative to the first bracket 31 in the axial direction X of the first conveying roller 10 to change the distance between the air amplifier and the tab P2 in the axial direction X of the first conveying roller 10.

According to the electrode plate conveying mechanism 100 provided by this embodiment of the present application, the end portion, corresponding to the tab P2, of the first conveying roller 10 is provided with the air amplifier. According to characters of the air amplifier, the negative pressure is formed around the tab P2 of the electrode plate P so as to reduce air resistance and then reduce the probability of folding of the tab P2; in addition, the negative pressure supply unit 20 is spaced apart from the first conveying roller 10 in the axial direction X of the first conveying roller 10 so as to be prevented from rubbing with the tab P2 and generating dust, thereby guaranteeing the product quality, increasing the material utilization rate and reducing the production cost; and meanwhile, the negative pressure supply unit 20 is the air amplifier, which is simple in structure and small in occupied space, is only driven by compressed gas, and is low in energy consumption and safe in use.

Although the present application has been described with reference to some embodiments, various improvements may be made thereto and components thereof may be replaced with equivalents without departing from the scope of the present application. In particular, the technical features mentioned in the various embodiments can be combined in any manner as long as there is no structural conflict. The present application is not limited to the specific embodiments disclosed herein, but includes all technical solutions falling within the scope of the claims.

What is claimed is:

1. An electrode plate conveying mechanism, comprising:

a first conveying roller configured to convey an electrode plate;

a negative pressure supply unit arranged on at least one end of the first conveying roller, spaced apart from the first conveying roller in an axial direction of the first conveying roller, and configured to form a negative pressure around a tab of the electrode plate so as to prevent the tab from being folded; and a first bracket and a second bracket, wherein the second bracket is movably connected to the first bracket, the first conveying roller is rotatably connected to the first bracket, and the negative pressure supply unit is movably connected to the second bracket.

2. The electrode plate conveying mechanism according to claim 1, wherein the negative pressure supply unit is an air amplifier, the air amplifier comprises an airflow-guiding cavity, an amplifying cavity communicating with the airflow-guiding cavity, and a gas intake port configured to convey compressed gas to the amplifying cavity, the airflow-guiding cavity is close to the first conveying roller relative to the amplifying cavity, the airflow-guiding cavity is provided with a suction port facing the first conveying roller, the amplifying cavity is provided with an exhaust port facing away from the first conveying roller, and the compressed gas is configured to establish the negative pressure, such that the airflow-guiding cavity guides, through the suction port, outside gas into the amplifying cavity.

3. The electrode plate conveying mechanism according to claim 2, wherein the air amplifier comprises a first cylinder and a second cylinder, the second cylinder is sleeved with a part of the first cylinder, the amplifying cavity is formed in the second cylinder, a part, not sleeving the second cylinder, of the first cylinder forms the airflow-guiding cavity, the gas intake port is formed in an outer peripheral surface of the first cylinder and penetrates through the first cylinder, the suction port is formed in the end, away from the second cylinder, of the first cylinder, the exhaust port is formed in the end, away from the first cylinder, of the second cylinder, an annular airflow chamber is formed between an inner peripheral surface of the first cylinder and an outer peripheral surface of the second cylinder, and the compressed gas input from the gas intake port enters the amplifying cavity after passing through the annular airflow chamber.

4. The electrode plate conveying mechanism according to claim 3, wherein the first cylinder rotatably sleeves the second cylinder, an annular boss is formed on an inner wall of the first cylinder, an annular gap is formed between an end portion, located in the first cylinder, of the second cylinder and the annular boss and communicates with the annular airflow chamber, and the compressed gas in the annular airflow chamber enters the amplifying cavity through the annular gap.

5. The electrode plate conveying mechanism according to claim 1, wherein the second bracket is provided with first strip-shaped holes extending in a thickness direction of the electrode plate; and the electrode plate conveying mechanism further comprises:

first adjusting members, which are connected to the negative pressure supply unit and movably penetrate through the first strip-shaped holes; and first locking members configured to be connected to the first adjusting members so as to lock the negative pressure supply unit to the second bracket.

6. The electrode plate conveying mechanism according to claim 1, wherein the second bracket is provided with second strip-shaped holes extending in the axial direction of the first conveying roller; and the electrode plate conveying mechanism further comprises:

second adjusting members which are connected to the first bracket and movably penetrate through the second strip-shaped holes; and second locking members which are configured to be connected to the second adjusting members so as to lock the first bracket to the second bracket.

7. The electrode plate conveying mechanism according to claim 1, wherein the electrode plate comprises a main body part and a tab protruding from the main body part, the first conveying roller comprises a first roller section and a second roller section which are sequentially connected in the axial direction of the first conveying roller, the diameter of the first roller section is greater than that of the second roller section, the first roller section is configured to convey the main body part, and the second roller section is configured to correspond to the tab.

8. The electrode plate conveying mechanism according to claim 7, wherein a diameter difference between the first roller section and the second roller section is 2 mm to 10 mm.

9. The electrode plate conveying mechanism according to claim 7, further comprising:

a second conveying roller that is arranged opposite to the first conveying roller, and a gap for the electrode plate to pass through is formed between the second conveying roller and the first conveying roller.

10. The electrode plate conveying mechanism according to claim 9, wherein a central axis of the negative pressure supply unit is parallel to a central axis of the first conveying roller, and is located between the first conveying roller and the second conveying roller.

11. The electrode plate conveying mechanism according to claim 9, wherein the length of the second conveying roller is smaller than that of the first conveying roller, and a projection of the second conveying roller on the electrode plate coincides with the first roller section.

12. The electrode plate conveying mechanism according to claim 9, wherein the second conveying roller comprises a third roller section corresponding to the first roller section and a fourth roller section corresponding to the second roller section, the fourth roller section is connected to the third roller section, the diameter of the fourth roller section is smaller than that of the third roller section, the third roller section is configured to convey the main body part, and the fourth roller section is configured to correspond to the tab.

13. The electrode plate conveying mechanism according to claim 9, wherein at least one of the first conveying roller and the second conveying roller is a driven roller.

14. An electrode plate conveying mechanism, comprising:

a first conveying roller configured to convey an electrode plate; and a negative pressure supply unit arranged on at least one end of the first conveying roller, spaced apart from the first conveying roller in an axial direction of the first conveying roller, and configured to form a negative pressure around a tab of the electrode plate so as to prevent the tab from being folded;

wherein the negative pressure supply unit is an air amplifier, the air amplifier comprises an airflow-guiding cavity, an amplifying cavity communicating with the airflow-guiding cavity, and a gas intake port configured to convey compressed gas to the amplifying cavity, the airflow-guiding cavity is close to the first conveying roller relative to the amplifying cavity, the airflow-guiding cavity is provided with a suction port facing the first conveying roller, the amplifying cavity is provided with an exhaust port facing away from the first conveying roller, and the compressed gas is configured to establish the negative pressure, such that the airflow-guiding cavity guides, through the suction port, outside gas into the amplifying cavity.

15. An electrode plate conveying mechanism, comprising:

a first conveying roller configured to convey an electrode plate; and a negative pressure supply unit arranged on at least one end of the first conveying roller, spaced apart from the first conveying roller in an axial direction of the first conveying roller, and configured to form a negative pressure around a tab of the electrode plate so as to prevent the tab from being folded;

wherein the electrode plate comprises a main body part and a tab protruding from the main body part, the first conveying roller comprises a first roller section and a second roller section which are sequentially connected in the axial direction of the first conveying roller, the diameter of the first roller section is greater than that of the second roller section, the first roller section is configured to convey the main body part, and the second roller section is configured to correspond to the tab.

* * * * *